May 8, 1956 W. A. HARTING 2,744,868
REGENERATION SYSTEM FOR WATER SOFTENING PLANT
Filed Jan. 2, 1952 2 Sheets-Sheet 1

INVENTOR.
Wesley A. Harting
BY
ATTORNEY.

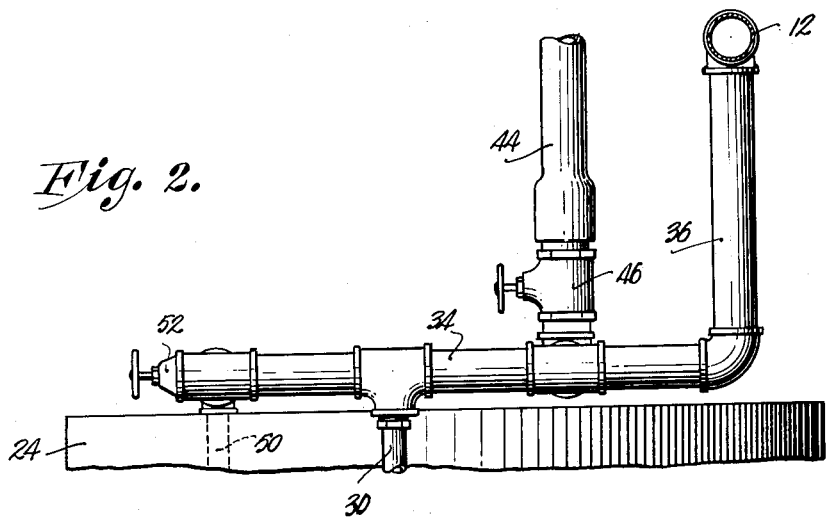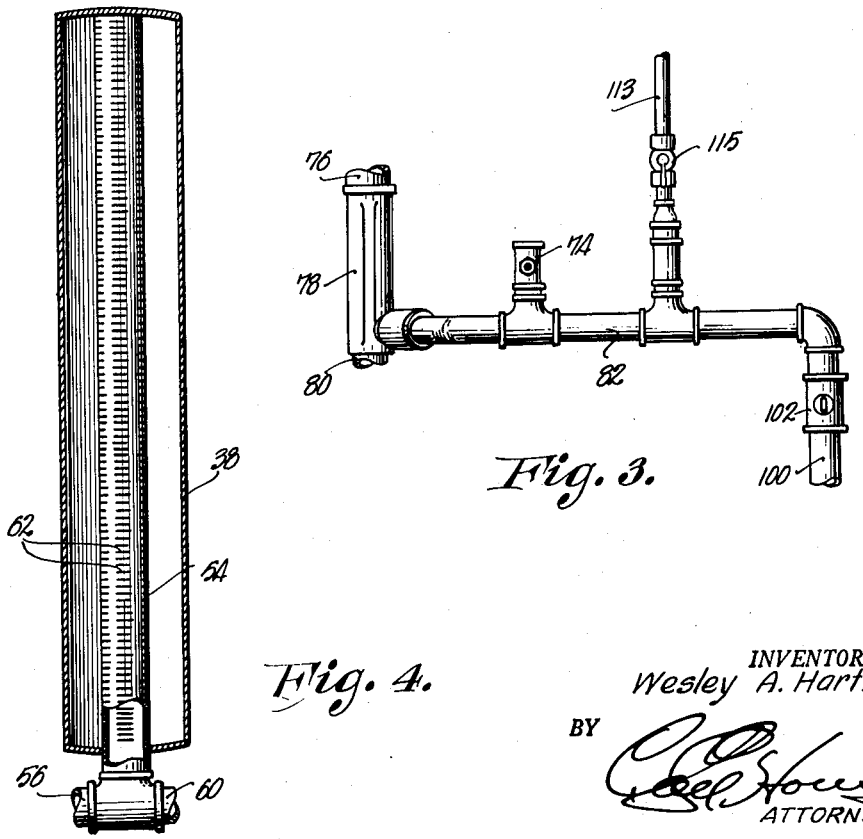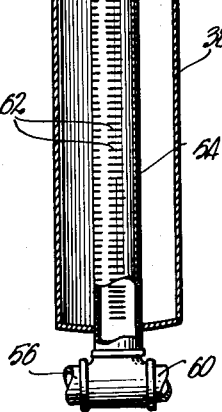

United States Patent Office 2,744,868
Patented May 8, 1956

2,744,868

REGENERATION SYSTEM FOR WATER SOFTENING PLANT

Wesley A. Harting, Kansas City, Mo.

Application January 2, 1952, Serial No. 264,537

2 Claims. (Cl. 210—24)

This invention relates to the water softening field wherein suitable substances are interposed in the water line for the purpose of removing chemicals in the water that render the same hard, the primary object being to provide a system for regenerating the substances and thereby placing the same in condition for subsequent use in softening of water.

It is the most important object of the present invention to provide a regeneration system capable of accommodating a relatively large amount of the substance to be regenerated requiring little operator attention as compared with systems now in common use and operable to effectively and positively place the water softening substance in a renewed condition where the same become fully capable of further use in softening of water.

It is an important object of the present invention to provide apparatus for removing chemicals from water softening substances that includes a drum for receiving the substances and useable in carrying out all of the steps of the regenerating process including back-wash, reclassification, subjection to salt brine, complete rinse, and treatment with chlorine or the like as desired.

It is another extremely important object of this invention to provide in apparatus of the aforementioned type, novel means including the force and flow of water to transfer the substance to the drum above mentioned, to introduce reclassification air into the substance being regenerated, and introduction of the salt brine needed to remove the unwanted chemicals previously removed from a hard-water line.

Other objects include many important details of construction, all of which will be made clear or become apparent as the following specification progresses, reference being had to the accompanying drawings, wherein:

Fig. 2 is an enlarged, fragmentary, cross-sectional view taken on line II—II of Fig. 1.

Fig. 3 is an enlarged, fragmentary, cross-sectional view taken on line III—III of Fig. 1; and Fig. 4 is an enlarged, fragmentary, detailed, cross-sectional view taken on line IV—IV of Fig. 1.

Figure 1:
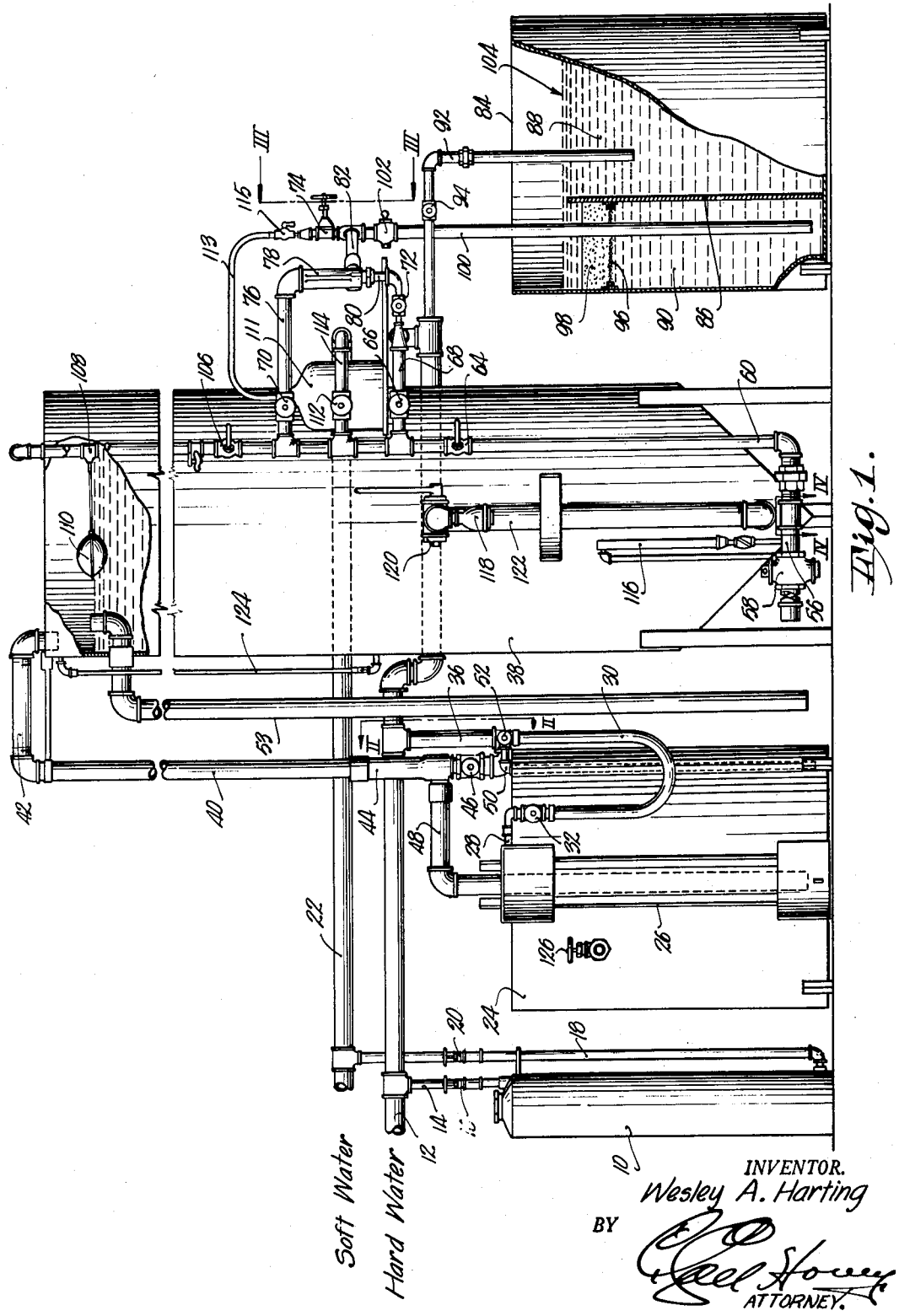
Figure 1 is a front elevational view of a regenerating system for water softening plants made pursuant to my present invention, parts being broken away and in section to reveal details of construction.

In the water softening field, suitable substances capable of removing chemicals from the hard water are contained within a tank and the latter is interposed in the hard water line where all of the water to be softened must traverse the substances. Such tank is of the same type as illustrated in Fig. 1 of the drawings and designated by the numeral 10, although tank 10 in the present system is used for the purpose of supplying soft water used in the regenerating process.

Accordingly, tank 10 contains the aforementioned substance and is coupled with a line 12 that is in turn coupled with a suitable source of hard water supply not shown. A pipe 14 having a value 16 therein, interconnects tank 10 and the line 12. Similarly, a pipe 18 provided with a valve 20, is joined with a line 22 which, for the purposes of the following description, may hereinafter be termed the "soft water line." The substances within tank 10 remove the chemicals from the water entering tank 10 by way of pipe 14 in the same manner as in the use of a tank such as at 10 in homes, factories and the like.

In the regenerating process of the present invention, the contents, i. e. the chemical removing substances, have a plurality of tanks such as at 10, are dumped into an open-top container 24, it being contemplated that the container 24 have a capacity capable of receiving the contents of approximately ten tanks. A bracket 26 capable of receiving one of the tanks, is hooked over the uppermost edge of container 24 for movement to any desired position thereon, and is tiltable for the purpose of emptying the contents of the tanks.

The tanks are flushed clean by means of a nozzle 28 inserted thereinto, and connected with a flexible hose 30 having a control valve 32 interposed therein. Hose 30 is in turn joined to a horizontal pipe 34 (see Fig. 2) that has connection with hard water line 12 by means of a short, vertical pipe 36. The substances to be regenerated are thereupon conveyed to an elongated, open-top drum 38 by means of a conduit 40 having an L-shaped branch 42 extending over and into the drum 38. The conduit 40 has a restriction 44 therein, and is coupled with the pipe 34 there being a control valve 46 within the conduit 40 between the restricted length 44 thereof and the pipe 34. An L-shaped branch 48 connected with the conduit 40, just above the valve 46, extends into the container 24 and terminates near the bottom thereof as indicated by dotted lines in Fig. 1. It is seen that by opening valve 46, after closing valve 32, water from line 12 will pass through pipe 36 into pipe 34 and thence into conduit 40 and branch 42 for emptying into the drum 38. By virtue of the hard water passing the restriction 44, a suction is created in the L-shaped branch 48 and the substances in container 24 are conveyed therefrom to the drum 38. After completion of this step, ten additional tanks as at 10, may be emptied into the container 24 and conveyed into the drum 38.

It is contemplated that the drum 38 be capable of receiving the contents of approximately forty tanks of the kind shown at 10 in Fig. 1 of the drawings. In order to be assured that the container 24 is completely emptied, an L-shaped branch 50 having a control valve 52 therein, couples with the pipe 34 and extends into the container 24, terminating near the bottom of the latter as indicated by dotted lines in Fig. 1. Water from line 12 and emptied into the container 24 by means of flush branch 50, is likewise conveyed into the drum 38 by way of conduit 40. A drain pipe 53 limits the level of water within the drum 38 below the uppermost end thereof.

An elongated, tubular manifold 54 is disposed within the drum 38 at the bottom thereof and extends outwardly therebeyond for connection with a drain pipe 56 having a valve 58 therein and for connection with an elongated tube 60 exteriorly of the drum 38. The tubular manifold 54 is provided with a plurality of relatively fine slits 62 incapable of passing the granular substances within the drum 38 when the water of the latter, used in the aforementioned conveying step, is drained from drum 38 by opening of valve 58. After the water has thus been drained from drum 38, the substances are back-washed by use of tube 60. Valve 64 in tube 60, and a valve 66 within a short pipe 68 interconnecting tube 60 and line 12, are opened, the hard water flowing from line 12 to pipe 68, thence to tube 60 and into the drum 38 by way of the tubular manifold 54. The water bubbling up through the substances within the drum 38, washes away through overflow pipe 53, foreign matter such as rust, corrosion and the like that has been collected by the water softening substances during the water-softening operation. Valves 64 and 66 are thereupon closed. The back-wash step tends to separate the small and larger granules and accordingly, reclassification may be accomplished by introducing air into the drum 38. Valve 58 is again closed and valves 64 and 70, 72 and 74 are opened in that sequence. Valve 70 is within an extension 76 coupled with tube 60 above pipe 68. Extension 76 joins with a vertical restriction 78 that in turn couples with a pipe 80 connected to pipe 68 and, accordingly, to line 12, the valve 72 being within pipe 80. A horizontal pipe 82 (Fig. 3), connects with the restrictions 78 and has the valve 74 interposed therein, the latter being open to the atmosphere. Thus, with hard water flowing from line 12 to pipe 80, past restriction 78, thence to extension 76 and tube 60 into the drum 38 by way of manifold 54, air is drawn into the pipe 82 by way of open valve 74 for introduction into the drum 38. After reclassification, valves 64, 70, 72 and 74 are again closed, and valve 58 opened to drain the water from drum 38.

The substances within the drum 38 are thereupon subjected to a salt brine. The brine is mixed and stored within an open-top receptacle 84 having a vertical partition 86 terminating below the uppermost end of the receptacle 84 and setting off a pair of compartments 88 and 90. An L-shaped line 92 provided with a valve 94, connects with the line 12 and terminates within the compartment 88 of receptacle 84.

A foraminous partition 96 within the compartment 90, just below the uppermost end of the partition 86, supports a quantity of gravel or other granular material 98 within the compartment 90. A vertical pipe 100 having a valve 102, connects with pipe 82, extends through the material 98, the screen or the like 96, and terminates at its lowermost end within the compartment 90 adjacent the bottom of receptacle 84.

Salt blocks or granules for producing the brine solution are placed in the compartment 88 of receptacle 84 and water from line 12 is introduced by way of line 92 upon opening of valve 94. The brine solution 104 overflows the partition 86, gravitates through the filtering means 96 and 98 into the compartment 90. The salt brine 104 is conveyed from the compartment 90 of receptacle 84, to the drum 38 by opening valves 70, 72, 102 and 106, the latter being within tube 60 above extension 76, it being seen that tube 60 is looped over the uppermost open end of drum 38 and is provided with a valve 108 within drum 38 controlled by a float 110. Water flowing from line 12 to pipe 80, past open valve 72 and thence through restrictions 78, extensions 76 and tube 60, past open valves 70 and 106, draws the brine solution 104 from compartment 90, the latter passing upwardly through pipe 100, past valve 102 into the pipe 82, and thence into the restriction 78. The float 110 prevents the loss of solution 104 to the drain line 53 by closing the valve 108 before the level of the solution 104 reaches the inlet end of pipe 53. While the solution 104 is conveyed to the drum 38, valve 58 is partially opened to present a continuous flow of solution 104 through the substances being regenerated within the drum 38. Consequently, by controlling valve 58 and through the action of float 110, the speed of flow of the brine solution 104, through the drum 38, may be predetermined.

At the end of this step, valves 70, 72 and 102, are closed and valve 58 is opened fully to drain the solution 104 from the drum 38. After closing of valve 58, chlorine or other purifying material, is introduced into the drum 38 from a bottle 111 containing the chlorine and connected with pipe 82 by conduit 113 having a valve 115 therein. By opening valve 115, valves 72, 70 and 106, the flow of water from line 12, past restrictions 78, draws the liquid from bottle 111 and introduces the same into the drum 38 by way of tube 60. Soft water from line 22 is thereupon introduced into the drum 38 to wash the substances of the brine solution 104, by opening valve 112 disposed within a pipe 114, coupling line 22 and tube 60 between extensions 76 and pipe 68. The soft water flows from line 22 through pipe 114, past the open valve 112 into the tube 60, past open valve 106 and thence into the tank 38 past open valve 108. The soft water is drained from the drum 38 by opening of valve 58 and the soft water flow is continued until by test, through use of a salometer 116 connected with pipe 56, it is determined that no brine solution 104 remains in the drum 38. Valves 112 and 58 are thereupon closed.

The tanks such as at 10, previously emptied into the container 24 and flushed clean by means of nozzle 28, are thereupon refilled with the regenerated substances in drum 38 by placing the same into communication with an outlet nozzle 118 below valve 120 in pipe 122 communicating with the drum 38. The head of soft water in drum 38, forces the substances through nozzle 118. The level of liquid in the drum 38 may always be determined by means of a view-tube 124 connected with drum 38, and, the container 24 may be drained of excess liquid as desired by means of a valve 126.

It is now seen that through the system of regeneration forming the subject matter of this invention, a large number of tanks such as at 10, may be emptied, their contents regenerated, and refilled for subsequent delivery and replacement in homes, businesses and the like and in a minimum amount of time. The operator can quickly and easily empty the substances into the container 24 and simultaneously convey the same to drum 38. After the back-wash and reclassification steps, the brine wash can be placed in operation and continued overnight or while the operator collects or re-delivers tanks to his customers.

In this respect it is preferred that the brine seep through the granular substances slowly and continuously over a period of time, but since the brine step needs no operator attention because of the automatic operation of float 110, cooperating with a pre-setting of valve 58, considerable time is saved so far as the operator is concerned in the entire regeneration process.

Having thus described the invention what is claimed as new and desired to be secured by Letters Patent is:

1. In apparatus of the kind described requiring connection only with a source of untreated water and the atmosphere for simultaneously regenerating the water-softening substance from a plurality of water-softener tanks, the combination as an integrated system of an open top container adapted to initially receive said substance from said tanks; an open top processing drum of greater height than the container; conduit structure communicating with the container adjacent the bottom of the latter and extending upwardly therefrom to a point of communication with the drum adjacent the top of the latter; a venturi tube connected into said conduit structure and provided with an outlet in communication with that portion of the structure leading to the drum, a suction inlet in communication with that portion of the structure leading to the container, and a pressure jet inlet; fluid carrying means, including a closure valve, communicating with said pressure jet inlet and adapted for connection with said source; fluid carrying means, including a closure valve, communicating with the container and adapted for connection with said source; drain means, including a filtering manifold and a closure valve, communicating with the drum adjacent the bottom of the latter; a fluid-carrying assembly, including a pair of spaced closure valves, communicating with the drum adjacent the bottom of the latter and with the drum adjacent the top of the latter; conduit means, including a closure valve, communicating with the fluid-carrying assembly between the valves, of the latter and adapted for connection with said source; fluid carrying structure, including a pair of spaced closure valves, communicating with the fluid-carrying assembly between the valves of the latter and adapted for connection with said source;

a venturi tube connected into said fluid carrying structure and provided with an outlet in communication with the valve of the fluid-carrying structure nearest said fluid-carrying assembly, a pressure jet inlet in communication with the valve of the fluid carrying structure nearest said source, and a suction inlet; pipe means, including a closure valve, communicating with the suction inlet of the last-mentioned venturi tube and with the atmosphere; an open top receptacle adapted to hold a quantity of brine-forming salt; fluid-carrying means, including a closure valve, communicating with the receptacle and adapted for connection with said source; fluid-carrying means, including a closure valve, communicating with the suction inlet of the last-mentioned venturi tube and with the receptacle; a water-softener tank having an inlet and an outlet; fluid-carrying means, including a closure valve, communicating with the inlet of the last-mentioned tank and adapted for connection with said source; fluid-carrying means, including a closure valve, communicating with the outlet of the last-mentioned tank and with the fluid-carrying assembly between the valves of the latter; and delivery pipe structure, including a closure valve, communicating with the drum adjacent the bottom of the latter and with the atmosphere, the extremity of the delivery pipe structure in communication with the atmosphere being disposed for redelivery of regenerated water-softening substance into one of said first-mentioned tanks.

2. In the invention as set forth in claim 1, wherein is provided an open top reservoir adapted to hold a quantity of liquid purifying material; fluid carrying means, including a closure valve, communicating with the suction inlet of the last-mentioned venturi tube and with the reservoir.

References Cited in the file of this patent

UNITED STATES PATENTS

| | | |
|---|---|---|
| 613,718 | Rae | Nov. 8, 1898 |
| 736,625 | Dupont | Aug. 18, 1903 |
| 941,036 | Parker | Nov. 23, 1909 |
| 1,328,456 | Ross | Jan. 20, 1920 |
| 1,354,604 | Duggan | Oct. 5, 1920 |
| 1,485,334 | Kriegsheim | Feb. 26, 1924 |
| 1,789,314 | Lindsay | Jan. 20, 1931 |
| 1,978,536 | Jeavons et al. | Oct. 30, 1934 |
| 2,252,065 | Culligan | Aug. 12, 1941 |
| 2,330,589 | Juell | Sept. 28, 1943 |
| 2,354,694 | McGill et al. | Aug. 1, 1944 |
| 2,572,082 | Welsh | Oct. 23, 1951 |
| 2,628,192 | Ziegelman | Feb. 10, 1953 |
| 2,698,292 | Mueller | Dec. 28, 1954 |